US006304957B1

(12) United States Patent
Ishihara et al.

(10) Patent No.: US 6,304,957 B1
(45) Date of Patent: Oct. 16, 2001

(54) MULTITASK PROCESSING UNIT

(75) Inventors: Hideaki Ishihara, Okazaki; Kouichi Maeda, Anjo, both of (JP)

(73) Assignee: Nippondenso Co., Ltd., Kariya (JP)

( * ) Notice: Subject to any disclaimer, the term of this patent is extended or adjusted under 35 U.S.C. 154(b) by 0 days.

(21) Appl. No.: 08/202,181

(22) Filed: Feb. 25, 1994

(30) Foreign Application Priority Data

Feb. 26, 1993 (JP) ................................................... 5-038267
Feb. 26, 1993 (JP) ................................................... 5-038268
Feb. 26, 1993 (JP) ................................................... 5-038269
Feb. 26, 1993 (JP) ................................................... 5-038270

(51) Int. Cl.$^7$ ................................. G06F 9/00; G06F 9/44

(52) U.S. Cl. .......................................... 712/228; 712/233

(58) Field of Search ..................................... 709/107, 108, 709/100; 712/200, 212, 228, 245, 233; 711/103; 713/501

(56) References Cited

U.S. PATENT DOCUMENTS

| | | | | |
|---|---|---|---|---|
| 4,393,465 | * | 7/1983 | Potash ................................... | 709/107 |
| 5,089,955 | * | 2/1992 | Morinaga et al. .................... | 713/501 |
| 5,202,967 | * | 4/1993 | Matsuzaki et al. ................... | 712/212 |
| 5,307,464 | * | 4/1994 | Akao et al. ...................... | 711/103 X |
| 5,349,680 | * | 9/1994 | Fukuoka ................................ | 709/100 |
| 5,506,963 | * | 4/1996 | Ducateau et al. ..................... | 709/107 |
| 5,574,872 | * | 11/1996 | Rotem et al. ......................... | 712/200 |
| 5,696,957 | * | 12/1997 | Yamaura et al. ..................... | 712/228 |
| 5,991,873 | * | 11/1999 | Seto et al. ............................. | 712/245 |

FOREIGN PATENT DOCUMENTS

| | | |
|---|---|---|
| 483437 | 5/1992 | (EP) . |
| 50-99652 | 8/1975 | (JP) . |
| 54-138354 | 10/1979 | (JP) . |

(List continued on next page.)

OTHER PUBLICATIONS

Kaneda, "Computer Architecture Series Microprocessor and RISC", published by OHM (1991) pp. 94–101. (translation of notice of rejection)

Tabaku et al., "RISC System", published by Kaibundo (1991) pp. 9–13, (as enclosed in translation of Japanese notice of rejection).

Lee et al.: "Pipeline Interleaved Programmable DSP'S: Architecture", IEEE Transactions of Acoustics, Speech and Signal Processing, vol. 35, No. 9, pp. 1320–1333, Sep. 1987.

Farrens et al: "Strategies for Achieving Improved Processor Throughput", Computer Architecture News, vol. 19 No. 3, May 1991, pp. 362–369.

"New Approach to eliminate branch cost in piplined super computers", IBM Technical Disclosure Bulletin, vol. 33, No. 3B, Aug. 1990, pp. 452–456.

Eaton et al: "The SX Mode Architecture", ICL Technical Hournal, vol. 7, No. 2, Nov. 1990, pp. 197–211.

Mahmood et al: "Concurrent error detection using watchdog processors—a survey", IEEE Transactions on Computers, vol. 37, No. 2, Feb. 1988, pp. 160–174.

*Primary Examiner*—Patrice Winder
(74) *Attorney, Agent, or Firm*—Pillsbury Winthrop LLP (57) ABSTRACT

The microcomputer shall be offered which has realized more simplified peripheral circuits and more reduced price, besides being provided with the functions of timer, runaway monitor and backup logic. To that effect, the address register and the register are installed which have two areas each in correspondence with two tasks (CPU0 and CPU1) to perform a pipeline processing of the two tasks in parallel and in time division by changing over alternately the two areas of the address register and the register by means of task switching signal. Then, while composing one task (L-task) with a fix-looped program for which a branch instruction is prohibited, the L-task is embedded with a routine to execute a runaway monitor and a timer operation for the other task (A-task). Furthermore, in case where anything abnormal is detected by L-task about the processing of A-task and it is reset, the L-task will execute a backup sequence to obtain a failsafe of the system.

12 Claims, 4 Drawing Sheets

FOREIGN PATENT DOCUMENTS

| | | |
|---|---|---|
| 56-17441 | 2/1981 | (JP) . |
| 56-099546 | 8/1981 | (JP) . |
| 59-157541 | 12/1981 | (JP) . |
| 58-155406 | 9/1983 | (JP) . |
| 59-032044 | 2/1984 | (JP) . |
| 60-74059 | 4/1985 | (JP) . |
| 60-252954 | 12/1985 | (JP) . |
| 62-75733 | 4/1987 | (JP) . |
| 1-169540 | 7/1989 | (JP) . |
| 2-87239 | 3/1990 | (JP) . |
| 3-266154 | 11/1991 | (JP) . |
| 3-294930 | 12/1991 | (JP) . |
| 59-191654 | 10/1994 | (JP) . |

* cited by examiner

MULTITASK PROCESSING UNIT

BACKGROUND OF THE INVENTION

1. Field of the Invention

This invention relates to a microcomputer which is equipped with the function of time shared parallel processing of plural programs.

2. Description of the Related Arts

Some of the recent microcomputers are designed to perform a time shared parallel processing of plural tasks by changing over the multi task processing in consecutive order by means of a register counter or a multiplexer as described, for instance, in the Japanease Patent Publication laid-open No. 58-155406, and No. 59-191654. In those conventional compositions, an exclusive hard timer is required to perform time processing by letting the elapsed time known when a task is executed. In addition, it is necessary to provide externally a runaway monitoring logic like a watchdog timer to monitor the runaway of program of each task, which contributes, combined with the above-mentioned matter, to making the peripheral circuits of a microcomputer complicated, leading to the product becoming larger-sized and more expensive.

Furthermore, in the conventional compositions, an erroneous jump to the address of other task and the execution of its instruction occurs due to an unexpected cause like noise. In the past, a reset method employed in such a case has been to provide a runaway monitoring logic such as a watchdog timer in the peripheral circuits, which involves time loss before a runaway is detected since it has to be monitored externally, and a risk of the memory data or port data being destroyed in the meantime.

Furthermore, the pipeline processing in the conventional microcomputers has the problem of there occurring pipeline disturbances when a branch instruction is executed, causing at least one wasteful cycle, i.e. delayed cycle, thereby delaying the pipeline processing. The cause of this wasteful cycle occurring after a branch instruction in the conventional pipeline processing is that if the branch instruction is fetched, the instruction address to be fetched next is predetermined in order beforehand regardless of the branch address, and the instruction of the branch address can be fetched only after this wasteful instruction is fetched.

In the past, it has been possible that the multiple-word instruction system with an unfixed number of instruction words, e.g. instruction system in which there are one-word instruction as well more than two-word instruction, can interpret an instruction wrongly due to mis-perception of the operation code or operand, thereby causing a program runaway or mass destruction of important information in data memory.

It is further possible for the program address to branch out to the address in the table immediate data area provided in the program memory, and an execution is started by perceiving the table immediate data as operation code, which also causes a program runaway or mass destruction of important information in data memory. On this account, it has been also necessary, in the past, to install a runaway monitoring logic such as a watchdog timer in the peripheral circuits, which contributes to making the peripheral circuits of a microcomputer complicated, resulting in the product becoming larger-sized and more expensive. Furthermore, the installation of a runaway monitoring logic such as a watchdog timer involves time loss before a runaway is detected since it has to be monitored externally, and a risk of the memory data or port data being destroyed in the meantime.

SUMMARY OF THE INVENTION

An object of this invention is to provide a microcomputer in which simplification of the peripheral circuits, reduction in price and facility of design alteration can be realized, besides being equipped with the function of timer or runaway monitoring.

Another object of this invention is to provide a microcomputer which can detect a branching by error to the address of other task due to an unexpected cause like noise in the multitask processing in much quicker response than the external monitoring method by means of such as a watchdog timer.

Still another object of this invention is to provide a microcomputer which can perform a pipeline processing quickly and without delay if there is a branch instruction.

Furthermore, it is also an object of this invention to provide a microcomputer which can prevent a data destruction if there occurs mis-perception of the operation code/ operand or address error.

The primary feature of the multitask processing unit of this invention is that it is equipped with the function to perform a parallel processing by switching plural programs for every several cycles in a certain time division, an instruction cycle condition memory means which, in the case of an instruction being on the way of execution when the program is switched, will retain the midway instruction to start execution from the midway condition at the time of the next execution cycle of the program in which said instruction is contained. It will allow a switch of plural programs in a certain cycle division ratio, not depending on the necessary cycle of the instruction, thereby securing the independence between the plural programs in terms of time.

In this case, if a branch instruction is prohibited for a specific program in the plural programs and a composition is employed in which a fixed loop execution is performed from the starting address to the specified address, incorporating in the said specific program the routine of at least either of the runaway monitor or the timer function, the specific program can, in the condition in which the program runaway or deadlock is prohibited by the fixed-looping, perform the runaway monitoring or timer operation of the programs of other task, allowing omission of the runaway monitoring logic in the peripheral circuits, hard timer or interrupt logic. It can also realize the facility of design alteration.

The secondary feature of the multitask processing unit of this invention is that it is equipped with the function to perform a parallel processing by switching plural programs for every several cycles in a certain time division, with each instruction of the said plural programs being added with the task identification bit to identify the kind of program, enabling an error check to be performed according to the contents of the said task identification bit after the reading of instruction. It allows to detect quickly a branching to the address of other task by error due to an unexpected cause like noise. In the case of two tasks, a parity bit can be used as task identification bit.

The third feature of the multitask processing unit of this invention is that it will perform a pipeline processing of the plural task programs in parallel by time division, a pipeline processing quick and without delay by using the wasteful cycle after the branch instruction contained in one program for another program. That is, it will perform a pipeline processing in parallel by switching plural programs for every several cycles in a certain time division, and, when a branch instruction is fetched, finish the execution (setting at the branch destination) one cycle before the instruction fetch stage following the program which contains said branch instruction, allowing to fetch the instruction of the branch address at the instruction fetch stage following the program which contains the said branch instruction. It eliminates the occurrence of a wasteful cycle in the pipeline if there is a branch instruction and prevents the pipeline from delaying.

The forth feature of the multitask processing unit of this invention is that, in the case of a unit which incorporates the data area for operation in the memory containing a program, there is installed in each instruction of the program a caution-requiring instruction discrimination bit composed of a small number of bits in said instruction which indicates a character of the instruction whether it is possible for the instruction to lead to a program runaway, while giving to the data in the data area a caution-requiring instruction discrimination bit provided with the value to indicate a non-caution-requiring instruction as the value for the afore-mentioned small number of bits. By this means, if a program address branches out to the address in the data area to be used in operation and an execution is started by perceiving the data as operation code, the execution as caution-requiring instruction is prohibited by the value embedded in the caution-requiring instruction discrimination bit for data, with only the non-caution-requiring instruction being executed, preventing the destruction of data.

DETAILED DESCRIPTION OF THE EMBODIMENTS

Figure 1:
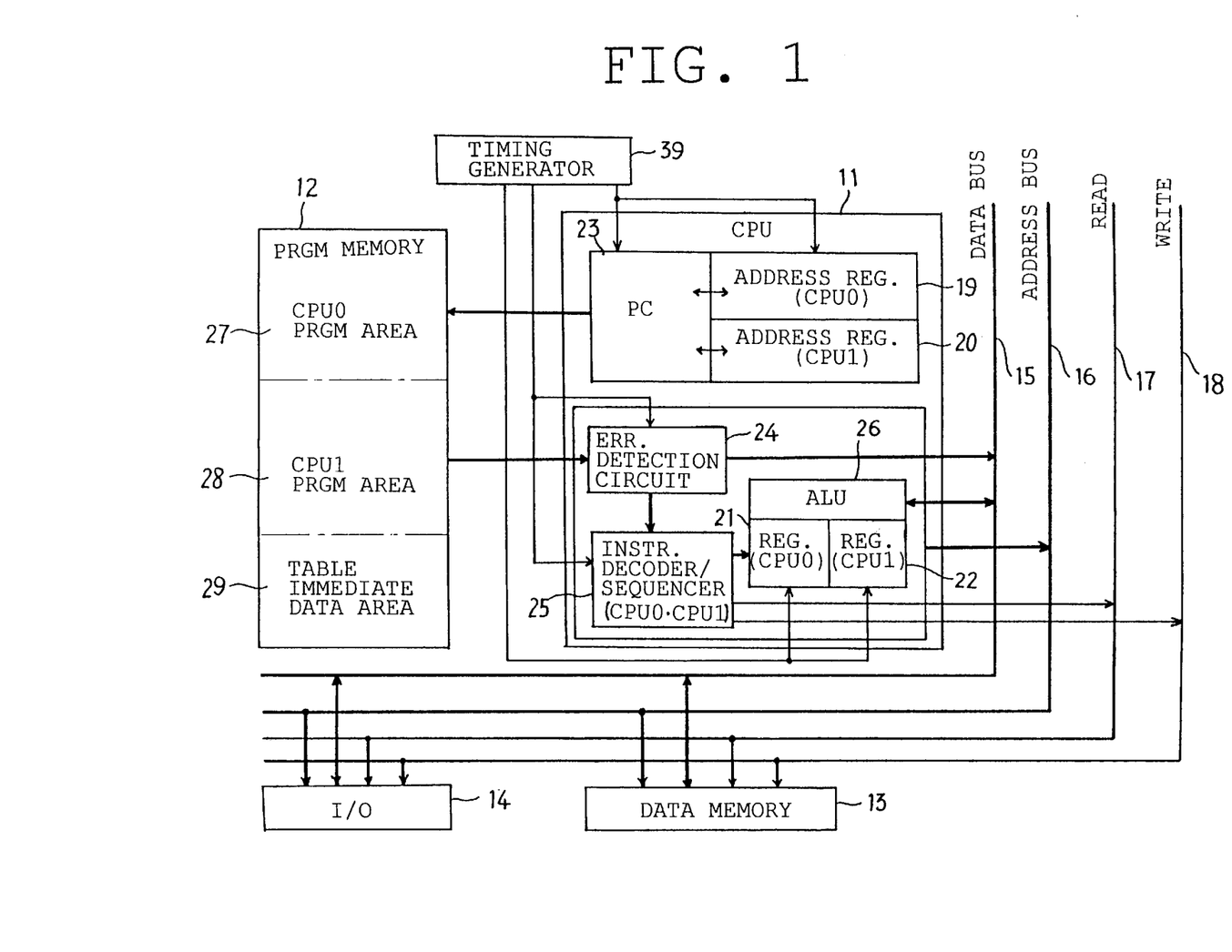
FIG. 1 is a block diagram of a computer showing an embodiment of this invention.

Described below is an embodiment of this invention referring to the drawings. The microcomputer in the embodiment is composed, for example, of a one-chip microcomputer, comprising CPU 11, program memory 12 consisting of ROM, data memory 13 consisting of RAM, I/O block 14 (input/output pin), timing generator 39 for generating a task switching signal (clock pulse) to be described later, data bus 15 for transmitting or receiving data, address bus 16 for transmitting or receiving address signal, and control bus 17 and 18 for transmitting or receiving read signal and write signal respectively.

For example, the CPU 11 is equipped with two address registers 19, 20 and two registers 21, 22 to perform a pipeline processing of two kinds of tasks (L-task and A-task) in parallel by time division. An alternate switch by the task switching signal from timing generator 39 of those address registers 19, 20 and registers 21, 22 will apparently actuate two CPU's by changing them over alternately. On this occasion, address register 19 and register 21 become the register for CPU0 (for L-task) while address register 20 and register 22 become the register for CPU1 (for A-task). According to the switching of address registers 19 and 20, the value of program counter 23 (address of the instruction to be fetched next) is renewed, the address signals for CPU0 (for L-task) and CPU1 (for A-task) being output alternately from program counter 23 to program memory 12.

Installed in CPU 11 are error detection counter 24 which detects the error by discriminating the kind of task to which the instruction read from program memory 12 belongs and instruction decoder/sequencer 25 which decodes the instruction passing through error detection circuit 24. According to the contents of the instruction decoded by instruction decoder/sequencer 25, an operation is performed by using register 21 and 22 on arithmetic/logic unit (ALU) 26 and read signal or write signal is output to control bus 17 and 18.

In program memory 12 are installed program area 27 for CPU0 (for L-task), program area 28 for CPU1 (for A-task) and table immediate data area 29. In this embodiment, the program for L-task stored in program area 27 for CPU0 is composed of the program in which a branch instruction having a risk of leading to a program runaway is prohibited and treated by a fixed loop. By this means, when the program of L-task is executed, the instruction is started in consecutive order from address-0 to address-1 to address-2 to address-3 and so forth, then returning to address-0 after reaching the specified address when the program counter 23 overflows, thereafter repeating the execution of instruction in the order of address as mentioned-above. With L-task, all instructions are fixed for one-word instruction. The reason is that in the case of the instruction system in which the number of words of instruction is not fixed (for example, the instruction system in which there are one-word instruction and two-word instruction), if a two-word instruction is read by mistake for a one-word instruction, it becomes impossible to know what to execute since the next instruction is not a proper one.

L-task is suitable for the processing of the sequence control, whose program includes the routine of runaway monitoring for A-task, other task, and the routine of backup sequence for obtaining a failsafe for the system. Furthermore, L-task is equipped with the function as a timer by fixed loop actuation. For instance, it executes an increment or decrement instruction, allowing a fixed time processing equivalent to timer interruption by generating interruption in the processing of A-task when the count value reaches a specific set point.

A-task is allowed a branch instruction which is prohibited in L-task, and is suited for complicated analytical and numerical processings. Like L-task, all instructions of A-task are also fixed for one-word instruction. In A-task and L-task, both operation code and operand (address) are allocated in one word.

Figure 2:
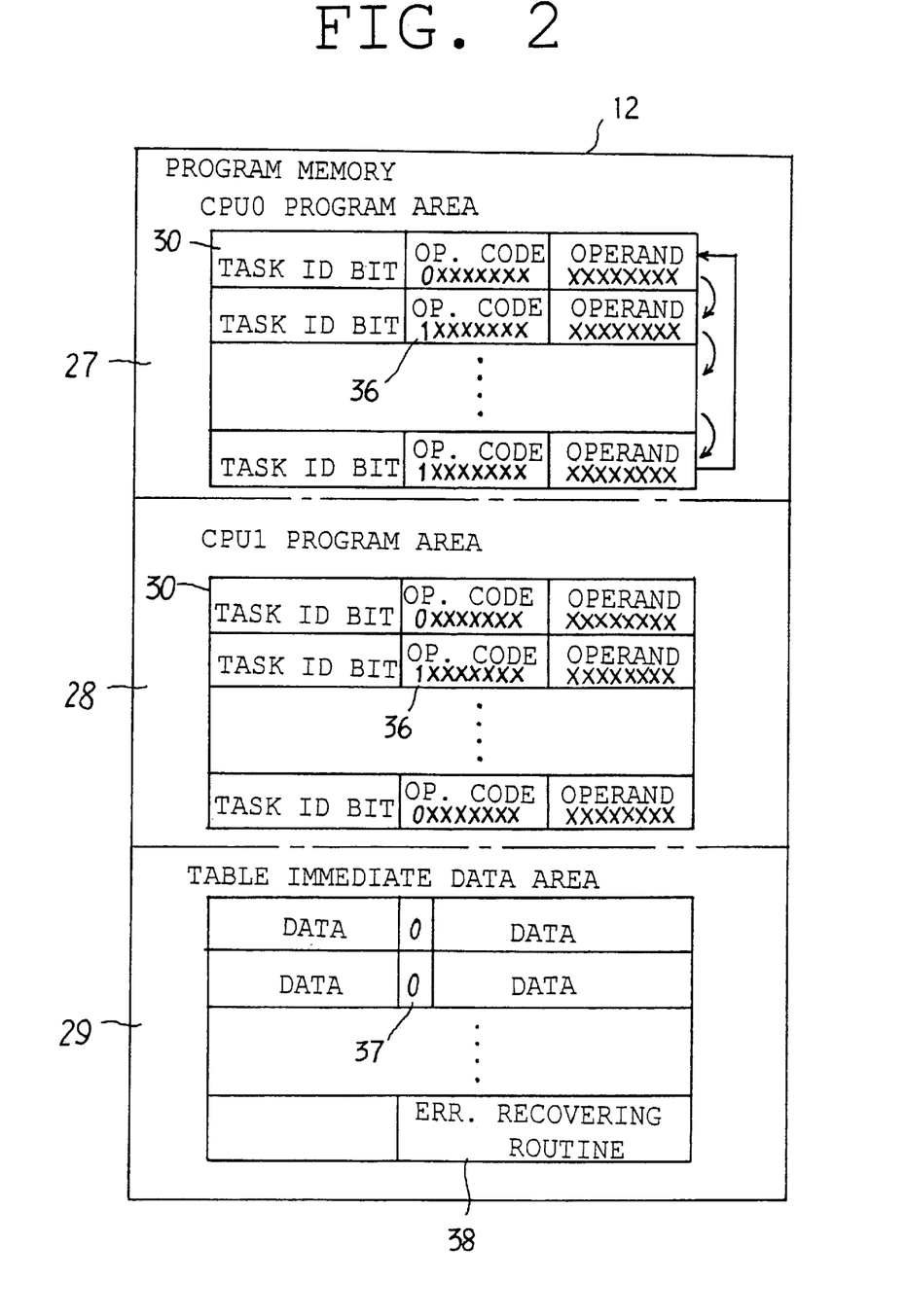
FIG. 2 is a diagram showing conceptually the storage condition of a program and a table immediate data in the program memory of an embodiment.

As shown in FIG. 2, each instruction of the program for L-task and A-task stored in program areas 27 and 28 for CPU0 and CPU1 in program memory 12 is provided with a task identification bit 30 to discriminate the kind of task, for example, at MSB (most significant bit). In this embodiment, the task identification bit 30 is parity bit, with L-task for odd parity and A-task for even parity. In this case, not only task discrimination but also instruction code check can be executed.

Figure 3:
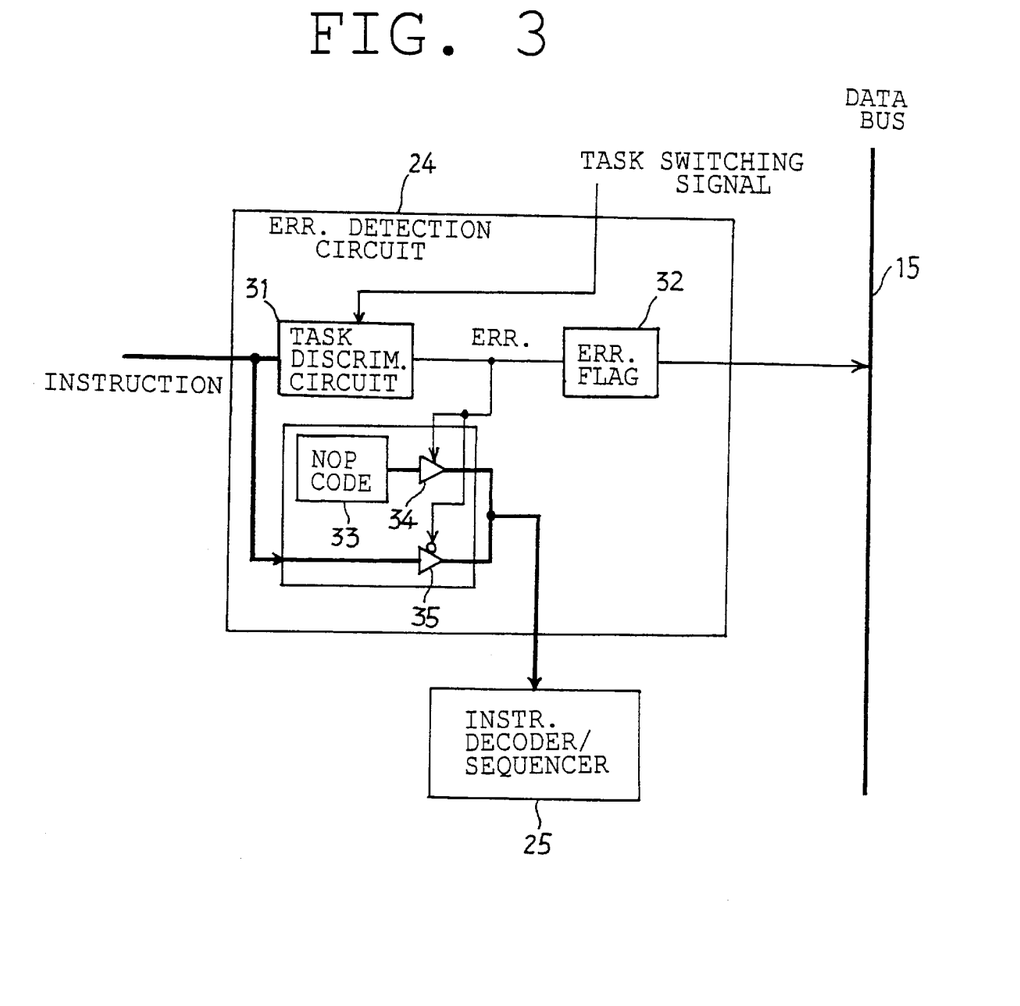
FIG. 3 is a block diagram showing the composition of the error detection circuit of an embodiment.

On the other hand, there is installed in CPU 11 an error detection circuit 24 for detecting an error by discriminating the kind of task of the instruction which is read from program memory 12, by means of parity check. The error detection counter 24 is to detect whether other task is going to be executed by error due to an unexpected cause like noise, and is composed, as shown in FIG. 3, of task discrimination circuit 31, error flag circuit 32, no-operation (NOP) code circuit 33, and both high active type and low active type transfer gates 34 and 35.

The above-mentioned task discrimination circuit 31 discriminates by means of parity check the kind of task the instruction read from program memory 12 belongs to (i.e. discriminating as L-task when odd parity and as A-task when even parity), and determine by comparing the results of discrimination with the task switching signal from the timing generator 39 whether or not an error has occurred. If there is an error, an error signal (high level signal) is output to error flag circuit 32 to reset address register 19 or 20 of the task in which the error has occurred. On this occasion, the error signal (high level signal) is also applied to the control terminals of both transfer gates 34 and 35, to turn on high active type transfer gate 34 and to output NOP code signal from NOP code circuit 33 to instruction decoder/sequencer 25, while turning off low active type transfer gate 35 to prevent passage of the instruction to instruction decoder/sequencer 25. On this account, in the case of a branching out to the address of other task by error due to an unexpected cause like noise and the instruction being started to be executed, no-operation condition is obtained instantly, i.e. by one instruction cycle to prevent the destruction of memory data or port data.

When there is no error, the output of task discrimination circuit 31 is maintained at low level to turn off high active type transfer gate 34 and to prevent passage of NOP code while turning on low active type transfer gate 35 to allow passage of the instruction to instruction decoder/sequencer 25.

In the case of the conventional multi-word instruction compositions, the mis-perception of operation code/operand has caused a program runaway or mass destruction of important information in data memory. Furthermore, it has been possible for program address to branch out to the address in table immediate data area 29 starting the execution by perceiving the table immediate data as operation code thereby resulting in a program runaway or mass destruction of important information in data memory.

In contrast to the above-mentioned, all instructions are, in this embodiment, designed for a fixed length of one word, with both operation code and operand allotted in one word. And the address is composed with program memory address completely separated from data memory address. This composition allows to prevent a program runaway beforehand due to the mis-perception of operation code/operand or the execution of instruction of data in data memory.

As shown in FIG. 2, the operation code of this embodiment is allotted with the danger instructions such as branch instruction of program, write instruction to data memory or instruction for system control, separated from other instructions, which can be discriminated by specific bits in the operation code. Applicable to them are caution-requiring instruction discrimination bits 36 and 37. When the caution-requiring instruction discrimination bits 36 and 37 are "0", it all indicates the transfer instruction (non-caution-requiring instruction for read line instruction) from data memory 13 to register 21 or 22. In table immediate data area 29, caution-requiring instruction discrimination bit 37 is embedded with "0".

For instance, if a program address should branch out to the address in table immediate data area 29 due to such as an address error and the execution be started by perceiving the table immediate data as an operation code, the execution as a caution-requiring instruction is prohibited on account of the value "0" set in caution-requiring instruction discrimination bit 37. That is, the operation transfer instruction from data memory 13 to operation register 21 or 22 is continued and the important information in data memory 13 is retained. Moreover, after the execution of operation transfer instruction to operation register 21 or 22 is finished, the error recovering routine 38 such as initialization processing described at the bottom of table immediate data area 29 is executed. By this means, the processing from error detection to error recovering can be performed in much quicker response than the external monitoring method by such as the conventional watchdog timer.

Now an explanation shall be given below, based on FIG. 4, for the pipeline control system employed in this embodiment. For instance, the pipeline in this embodiment consists of three stages of instruction fetch, instruction decoding and instruction execution. It is so designed that all instructions can be processed by the three-stage pipeline without delay. Each stage is executed in one cycle, with one instruction executed in three cycles. However, parallel processing of three instructions by the three-stage pipeline makes it apparently equivalent to executing one instruction in one cycle. The time for one cycle (each stage) is provided by task switching signal (clock pulse) output from the timing generator 39. In this task switching signal, low level time TLo and high level time THi are the same, and, by performing the instruction fetch of CPU0 (L-task) in the high level period and the instruction fetch of CPU1 (A-task) in the low level period of task switching signal, the pipeline processing of both programs for CPU0 (L-task) and CPU1 (A-task) is performed in parallel in the time division ratio of 1:1. On this account, the instruction fetch and the instruction deciding of both tasks are in the reverse CPU relation, i.e. relation in which an instruction of one task is fetched while an instruction of the other task is decoded.

Furthermore, for instance, when CPU1 (A-task) has fetched an instruction which requires more than one cycle, this instruction is switched in the way of execution. However, in this case, the instruction decoder/sequencer 25 has memorized the instruction cycle condition and the execution starts in the next CPU1 cycle from the midway condition of instruction and finishes after using the required number of cycle. That is, the switching is performed in time division ratio of 1:1, not depending on the required cycle for instruction. On this account, independence in terms of time is secured for CPU0 (L-task) and CPU1 (A-task), actuating as if there are two CPU's.

Moreover, in this embodiment, when the branch instruction is fetched, in order to fetch the instruction of the branch address at the next instruction fetch stage for the task in which said branch instruction is contained, it is so composed that the branch address is to be set at the instruction decoding stage.

Figure 4:
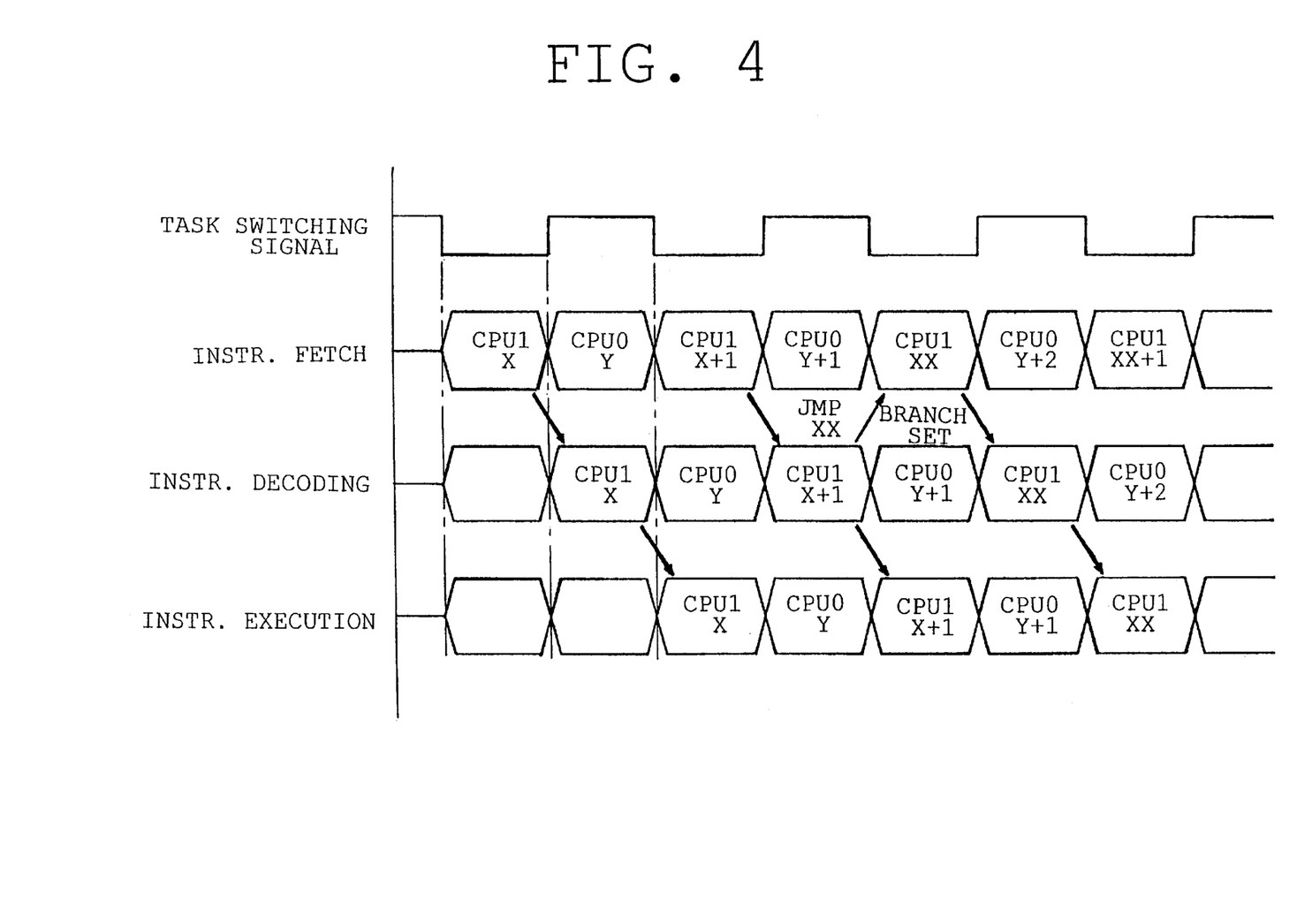
FIG. 4 is a time chart to be used for explaining the pipeline processing of an embodiment.

As shown in FIG. 4, the procedure of the pipeline processing of this embodiment is that the instruction fetch of CPU0 (L-task) and the instruction fetch of CPU1 (A-task) are repeated alternately by task switching signal, and, while the instruction of one task is fetched, the instruction of the other task, which is fetched one cycle earlier, is decoded; and while the instruction of one task is decoded, the instruction of the other task, which is decoded one cycle earlier, is executed. By this means, the pipeline processing of the program of two tasks is performed in parallel in time division ratio of 1:1.

As shown in FIG. 4, during the pipeline processing, for example, if the instruction of (X+1) address of CPU1 is a branch address (JMP), the branch address (XX address) is set at the instruction decoding stage where the branch instruction of the said (X+1) address is decoded, and, the instruction of the branch address (XX address) is fetched at the next instruction fetch stage for the task (CPU1) which contains said branch instruction. On this account, the pipeline does not develop a wasteful cycle, i.e. delay cycle, if there is a branch instruction, which prevents the pipeline from being delayed. On this occasion, since the setting of a branch address (execution of branch instruction) is performed at the instruction decoding stage, no processing for the branch instruction is to be performed at the instruction execution stage.

As explained above, in this embodiment, since L-task is composed of the fix-looped program in which a branch instruction having risk of leading to a program runaway is prohibited, L-task is free from a possibility of leading to a program runaway or deadlock, and repeats a prescribed program. Moreover, since L-task is provided with the function of runaway monitor and timer for A-task, other task, the program runaway monitor, timer operation and timer interruption can be performed by L-task, allowing the runaway monitoring logic, hard timer and interrupt logic to be omitted in the peripheral circuits. Freedom in the design alteration is secured by realizing those functions in programs.

Furthermore, in the case where something abnormal is detected by L-task on the processing of A-task and it is reset, since L-task repeats a fix-looped program of no branch instruction, it is possible to execute a backup sequence by means of L-task so as to obtain a failsafe of the system. It eliminates the necessity to compose a backup logic externally, and, together with the above-mentioned matter, contributes to making the peripheral circuits simplified, smaller-sized and less expensive.

In this embodiment, though L-task is provided with the function of both the runaway monitor and the timer for A-task, it is good enough if it has at least either one of them. Simplification of the peripheral circuits can be expected even in this case. Furthermore, in this embodiment, though the time division parallel processing is performed for two tasks, it may be done for three or more tasks. In this case, more than one task may be composed of fix-looped program without branch instruction.

In this embodiment, each instruction of the program for L-task and A-task is provided with task identification bit 30 to distinguish the kind of task, allowing to determine, when reading each instruction from program memory 12, whether or not there is an error by discriminating the kind of task the instruction belongs to by means of error detection circuit 24. On this account, if a branching out to the address of other task is performed by error due to an unexpected cause like noise, the error can be detected earlier than the instruction is decoded, rendering the instruction to be an invalid instruction like NOP. That is, it is possible to detect an error in much quicker response than the external monitoring logic such as watchdog timer to be installed in the peripheral circuits, enabling the prevention of the destruction of memory data or port data, protecting each task from the other and securing the independence.

It goes without saying that the processing when an error is detected is not limited to the invalid instructions like NOP. For instance, the task on which there has occurred an error may be reset. In this embodiment, though task identification bit 30 is a parity bit, the value of task identification bit 30 may be set for L-task being "0" and A-task being "1" so that the kind of task can be judged according as the value of task identification bit 30 is "0" or "1". Moreover, the number of bit of task identification bit 30 may not be limited to one bit, but it may be more than one bit. Also, in the case of the number of task being three or over, a task identification bit may be composed of more than one bit. Needless to say, the location where task identification bit 30 is provided may not be limited to MSB, but it may be at other location. Furthermore, the composition of error detection counter 24 may be altered in a variety of ways within a range not deviating from the point.

In this embodiment, when the pipeline processing is performed for the programs of more than one task in parallel in a certain time division, if the branch instruction which is contained in the program of each task is fetched, the instruction of a branch address is fetched at the next instruction fetch stage of the task in which the branch instruction is contained. On this account, the wasteful cycle after branch instruction can be eliminated, the delay of pipeline prevented, allowing the pipeline processing of more than one task to be performed quickly and without delay.

In the embodiment mentioned above, the pipeline processing is performed for two tasks in a certain time division. However, the pipeline processing may be performed for three or more tasks in time division. In case where the pipeline processing is performed for N-piece tasks in time division, if the setting (execution of branch instruction) of branch address is performed during (N–1) cycles after the branch instruction is fetched, the wasteful cycle after branch instruction can be prevented. In this relation, in case where the pipeline processing is performed for two tasks as in this embodiment, it is necessary to set the branch address during the cycle immediately after the branch instruction is fetched, i.e. at the instruction decoding stage. However, in case where the pipeline processing is performed for three tasks, the branch address may be set during two cycles after the branch instruction is fetched. As mentioned above, in the case of three tasks, since the setting of branch address may be performed during two cycles after the branch instruction is fetched, if the address designation system for the branch instruction is the relative address designation system which requires address computation, the branch address can be set before the next instruction fetch stage of the task which contains the branch instruction. Moreover, in this embodiment, though the pipeline is composed of three stages each of instruction fetch, instruction decoding and instruction execution, it may be composed of four stages or more.

According to this embodiment, if the program address has branched out to the address in the data area due to such as address error, non-caution-requiring instruction is executed by the value embedded in the caution-requiring instruction discrimination bit for data, and the important information in data memory can be retained. What is more, when the program address has branched out to the address in the data area due to such as address error, a quick error recovering can be performed, the processing from error detection to error recovering being carried out in much more quicker response than the external monitoring method by such as the conventional watchdog timer.

In the above embodiment, though error recovering routine 38 like initialization routine is written at the end of table immediate data area 29, an instruction to judge an error by parity check may, of course, be written. Furthermore, the error detection/recovering system of this embodiment can also be adopted for what is deemed as the multi-word instruction system, and caution-requiring instruction discrimination bit may be embedded in data word of multi-word instruction. In this case also, the mis-perception of operation code and operand can be prevented more securely. In addition, the number of bit of caution-requiring instruction discrimination bit 36 and 37 is may not be limited to one bit, but it may be more than one bit. Needless to say, the location where caution-requiring instruction discrimination bits 36 and 37 are provided is not limited to the one shown in this embodiment. Furthermore, the error detection/ recovering system of this embodiment is not limited to the time division parallel processing of more than one task, but it can also be applied to a processor executing one task.

What is claimed is:

1. A multitask processing unit comprising:

a program memory storing programs of first and second tasks;

first and second address registers provided in correspondence with each of said programs of said first and second tasks;

means for generating a switching signal to switch alternately said first and second address registers in a certain time division ratio;

means for executing an instruction, which fetches the instruction of said program of said first task or second task based on one of said first or second address register selected by said switching signal from said generating means and executes the fetched instruction; and means for memorizing a cycle condition of said instruction when switched by said generating means, wherein said program of said first task is prohibited from branch instructions, and is composed to be executed fix-looped from its start address to a specific address;

wherein each instruction of the programs of said first and second tasks includes a task identification bit to indicate the kind of task, and further comprising a task discrimination means for checking a content of said task identification bit before an execution of the instruction by the executing means;

wherein said task discrimination means checks an execution task based on said switching signal from said generating means and the content of said task identification bit; and further comprising means for sending prohibition instruction which is sending a no-operation instruction in place of each instruction of said programs to the executing means, when said task discrimination means judges that the content of the task identification bit and the execution task does not conform.

2. The multitask processing unit according to claim 1, wherein a parity bit is provided for said task identification bit.

3. The multitask processing unit according to claim 1, wherein said executing means has first and second registers installed in correspondence with each of the programs of the said first and second tasks.

4. The multitask processing unit according to claim 3, wherein said first and second registers are alternately switched based on the switching signal from the generating means.

5. The multitask processing unit according to claim 4, wherein said executing means, when fetching a branch instruction, finishes setting the branch address one cycle before the next instruction fetch stage of the program in which said branch instruction is contained.

6. The multitask processing unit according to claim 1, wherein said program memory stores the data area to be used for operation, each instruction of the programs of the first and second tasks indicates whether it is a caution-requiring instruction or not by a small number bit in the instruction, and the data area is provided with the value indicating a non-caution-requiring instruction for the value of the small number bit.

7. A control method for a multitask processing unit having a program memory storing programs of first and second tasks, and first and second address registers provided in correspondence with each of said first and second tasks, the method comprising:

generating a switching signal to switch alternately said first and second address registers in a certain time division ratio;

checking a content of a task identification bit of each instruction of the programs of said first and second tasks, the bit indicating the kind of task;

sending a prohibition instruction in place of each instruction of said programs when the content of the task identification bit and an execution task do not conform; and executing the instruction by fetching the instruction of said program of said first task or second task based on one of said first or second address register selected by said switching signal when the prohibition instruction is absent.

8. The control method according to claim 7, including providing a parity bit for said task identification bit.

9. The control method according to claim 7, including when the instruction contained in the program is on the way of execution when switched, switching the program while retaining the midway condition of the instruction, and an execution of the program is started from the midway condition at the next execution cycle of the program in which the said instruction is contained, to thereby allow a switching in a certain cycle division ratio not depending on the required number of cycle of the instruction.

10. The control method according to claim 7, including protecting each program from other programs and securing the independence by performing error check after reading the instruction.

11. The control method according to claim 7, including executing the programs in parallel by switching for every several cycles in a certain time division, so that, when a branch instruction is fetched, setting a branch address is finished at least one cycle before the next instruction fetch stage of the program in which the branch instruction is contained, to thereby fetch the instruction of the branch address at the next instruction fetch stage without generating a delayed cycle.

12. The control method according to claim 7, wherein each instruction of the program includes a small number bit, said method including indicating whether an instruction is a caution-requiring instruction like a branch instruction which has a risk of leading to a program runaway, the data area including a value indicating a non-caution-requiring instruction as said small number bit, thereby prohibiting the execution of the caution-requiring instruction of the data area.

* * * * *